US007822421B2

(12) United States Patent
Laroia et al.

(10) Patent No.: US 7,822,421 B2
(45) Date of Patent: *Oct. 26, 2010

(54) APPARATUS AND METHOD FOR USE IN ALLOCATING A CHANNEL RESOURCE IN WIRELESS MULTIPLE ACCESS COMMUNICATIONS SYSTEMS

(75) Inventors: Rajiv Laroia, Basking Ridge, NJ (US); Junyi Li, Matawan, NJ (US); Sathyadev Venkata Uppala, Scotch Plains, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 662 days.

This patent is subject to a terminal disclaimer.

(21) Appl. No.: 11/752,588

(22) Filed: May 23, 2007

(65) Prior Publication Data
US 2007/0217390 A1    Sep. 20, 2007

Related U.S. Application Data

(60) Division of application No. 10/957,194, filed on Oct. 1, 2004, now Pat. No. 7,245,920, which is a continuation of application No. 09/706,377, filed on Nov. 3, 2000, now Pat. No. 6,819,930.

(51) Int. Cl.
*H04W 72/00* (2009.01)
(52) U.S. Cl. .................... 455/450; 455/464; 455/452.1
(58) Field of Classification Search ......... 455/452–455, 455/464
See application file for complete search history.

(56) References Cited
U.S. PATENT DOCUMENTS
4,346,470 A    8/1982   Alvarez, III et al.
(Continued)

FOREIGN PATENT DOCUMENTS
WO    WO9830052    7/1998

OTHER PUBLICATIONS

PCT International Search Report, for PCT Application No. PCT/US2002/038627, dated Apr. 18, 2003.

*Primary Examiner*—Charles N Appiah
*Assistant Examiner*—Emem Stephen
(74) *Attorney, Agent, or Firm*—Ryan, Mason & Lewis, LLP

(57) ABSTRACT

Allocation of a wireless communications system channel resource is managed by utilizing traffic segment allocation. This is realized by partitioning the channel resource into an assignment channel and a traffic channel in a fixed manner. The assignment channel includes assignment segments and the traffic channel includes traffic segments. The traffic segment is the basic traffic channel resource unit used to transport traffic data and has a prescribed finite time interval and bandwidth. Each traffic segment is associated with a so-called assignment segment in a prescribed manner. One or more traffic segments may be associated with a particular assignment segment. A base station broadcasts via an assignment segment which wireless terminal is to use a particular traffic segment. This is realized by transmitting a simply identifier for the particular wireless terminal assigned to the particular traffic segment in the assignment segment. Then, each active wireless terminal monitors all of the received assignment segments to detect any traffic channel assignments. Once a wireless terminal detects its identifier in an assignment segment, it proceeds to receive/transmit the traffic data in the traffic segment associated with the assignment segment including the detected identifier.

20 Claims, 5 Drawing Sheets

U.S. PATENT DOCUMENTS

| | | |
|---|---|---|
| 5,757,788 A | 5/1998 | Tatsumi et al. |
| 6,256,486 B1 | 7/2001 | Barany et al. |
| 6,473,419 B1 | 10/2002 | Gray et al. |
| 6,510,174 B1 | 1/2003 | Sexton et al. |
| 6,819,930 B1 * | 11/2004 | Laroia et al. ................ 455/450 |
| 2002/0114295 A1 | 8/2002 | Takahiro et al. |
| 2003/0058923 A1 | 3/2003 | Chen et al. |

* cited by examiner

APPARATUS AND METHOD FOR USE IN ALLOCATING A CHANNEL RESOURCE IN WIRELESS MULTIPLE ACCESS COMMUNICATIONS SYSTEMS

CROSS-REFERENCE TO RELATED APPLICATION(S)

This application is a divisional of U.S. application Ser. No. 10/957,194, filed Oct. 1, 2004 now U.S. Pat. No. 7,245,920, the disclosure of which is incorporated by reference herein, which is a continuation of U.S. application Ser. No. 09/706,377 which was filed on Nov. 3, 2000 and issued as U.S. Pat. No. 6,819,930, and this application is related to U.S. application Ser. No. 09/706,132 which was filed on Nov. 3, 2000 and issued as U.S. Pat. No. 6,816,478, and is also related to U.S. application Ser. No. 09/706,534 which was filed on Nov. 3, 2000 and issued as U.S. Pat. No. 6,804,528.

FIELD OF THE INVENTION

This invention relates to wireless communications systems and, more particularly, to wireless communications between wireless terminals and base stations in a multiple access communications system.

BACKGROUND OF THE INVENTION

In a wireless multiple access communication system, the wireless traffic channel resource, e.g., bandwidth and time interval, is shared by all the wireless terminals, i.e., mobile units, in a particular cell. Efficient allocation of this traffic channel resource is very important, as it directly impacts the utilization of the traffic channel resource and the quality of service perceived by individual wireless terminal users. One such wireless communications system is the Orthogonal Frequency Division Multiplexing (OFDM) based Spread Spectrum Multiple Access system.

In a traditional wireless system, the traffic channel resource is managed by use of rate allocation. In particular, a dedicated control channel is typically established between a base station and a particular wireless terminal. The base station then allocates to the wireless terminal a traffic channel having a prescribed transmission rate through control message exchange on the dedicated control channel. Once the transmission rate allocation is completed, the wireless terminal may use the allocated traffic channel for an indefinite duration. When the traffic requirement changes, the base station and the wireless terminal change the transmission rate of the traffic channel again through control message exchange. A problem with this control message based transmission rate allocation arrangement is that in general the control message exchange can take quite a significant amount of time to complete and, consequently, the traffic channel resource allocation process may be quite inefficient. Specifically, assume that control message exchange takes time T to be completed. Suppose that a traffic channel has already been assigned to a wireless terminal. Further assume that there is some idle interval during which the assigned wireless terminal has no traffic to be transmitted. Then, it is impossible to allow another wireless terminal to utilize the traffic channel resource in the idle interval that is less than T, thereby resulting in under utilization of the traffic channel resource. In another example, assume that "low" priority traffic has been transmitted for one wireless terminal, then when "high" priority traffic arrives for another wireless terminal, the base station has to change the traffic channel resource allocation from the wireless terminal having the low priority traffic to the wireless terminal having the arriving high priority traffic. Exchanging control messages to realize the required traffic channel allocation change introduces latency in transmission and/or reception of the high priority traffic, which is extremely undesirable.

SUMMARY OF THE INVENTION

These and other problems and limitations of prior known wireless communications system traffic channel resource allocation arrangements are overcome by managing the traffic channel resource utilizing traffic segment allocation. This is realized by partitioning the channel resource into an assignment channel and a traffic channel in a fixed manner. The assignment channel includes assignment segments and the traffic channel includes traffic segments. The traffic segment is the basic traffic channel resource unit used to transport traffic data and has a prescribed finite time interval and bandwidth. Each traffic segment is associated with a so-called assignment segment in a prescribed manner. One or more traffic segments may be associated with a particular assignment segment. A base station broadcasts via an assignment segment which wireless terminal is to use a particular traffic segment. This is realized by transmitting a simple identifier for the particular wireless terminal assigned to the particular traffic segment in the assignment segment. Then, each active wireless terminal monitors all of the received assignment segments to detect any traffic channel assignments. Once a wireless terminal detects its identifier in an assignment segment, it proceeds to receive/transmit the traffic data in the traffic segment associated with the assignment segment including the detected identifier.

Technical advantages of applicants' unique invention are that: no control message or other message exchange is required; the traffic channel resource can rapidly be assigned to different wireless terminal users based on their traffic needs and channel conditions; and resource scheduling can be realized in an extremely flexible manner.

DETAILED DESCRIPTION OF THE INVENTION

Figure 1:
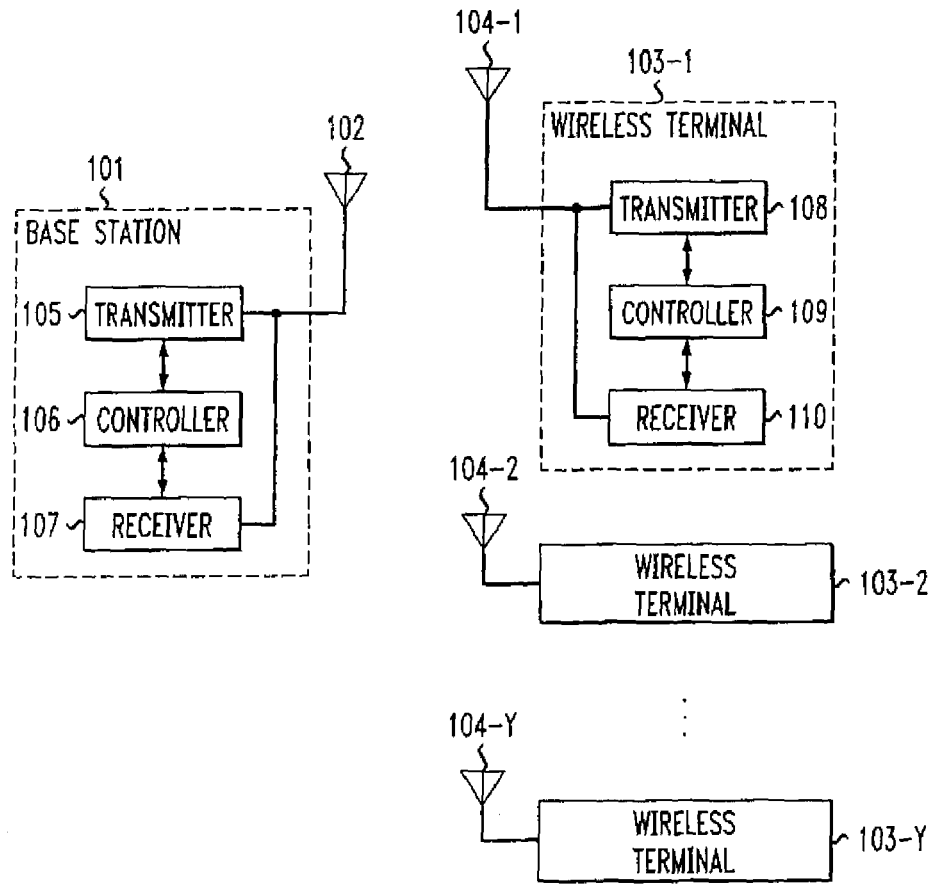
FIG. 1 shows, in simplified block diagram form, a wireless multiple access communications system in which the invention may be advantageously employed.

FIG. 1 shows, in simplified block diagram form, a wireless mobile multiple access communications system in which the invention may be advantageously employed. It should be noted that although applicants' unique invention will be described in the context of a wireless mobile communications system, it has equal application to non-mobile, e.g. fixed, wireless communications systems. As indicated above, one such mobile wireless communications system is OFDM based spread spectrum multiple access.

Specifically, shown in FIG. 1 is a mobile multiple access wireless communications system 100. System 100 includes base station 101 including antenna 102 and one or more remote wireless terminals, i.e., mobile units, 103-1, 103-2 through 103-Y including associated antennas 104-1, 104-2 and 104-Y, respectively. Transmission of signals is from and to base station 101 to and from remote wireless terminals 103. All of wireless terminals 103 share the transmission spectrum in a dynamic fashion. This is realized by managing the channel, i.e., bandwidth and time interval, in the form of segments and by the dynamic allocation of the traffic segments by associating traffic segments to a particular assignment segment in a prescribed manner. In particular, base station 101 dynamically broadcasts the assignment of traffic data channels to the remote wireless terminals 103 by use of a simple identifier for each of the active wireless terminals 103. Remote wireless terminals 103 monitor all assignment segments to detect whether their identifier is included in the assignment segment. After detecting its identifier, a particular remote wireless terminal 103 then receives/transmits its data segments in the assigned traffic data channel.

In this example, base station 101 includes transmitter 105, receiver 107 and controller 106 for transmitting and receiving wireless messages via antenna 102. Controller 106 is employed to control operation of transmitter 105 and receiver 107, in accordance with the invention. Similarly, in this example, each of wireless terminals 103-1 through 103-Y includes transmitter 108, receiver 110 and controller 109 for transmitting and receiving wireless messages via antenna 104. Controller 109 is employed to control operation of transmitter 108 and receiver 110, in accordance with the invention.

Figure 2:
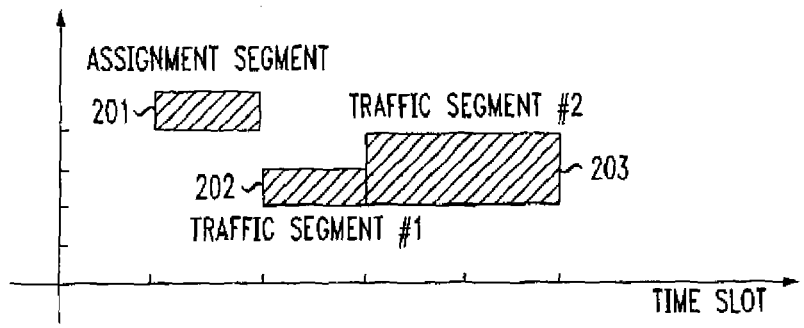
FIG. 2 is a graphical representation illustrating an assignment segment and a number of traffic segments useful in describing the invention.

FIG. 2 illustrates the physical mechanism of managing the channel resource in the form of traffic segments 202 and 203 and an assignment segment 201. The wireless channel resource (bandwidth and time interval) is partitioned into an assignment channel including one or more assignment segments 201, etc., and a traffic channel including a plurality of traffic segments 202, 203, etc. Also shown are time slots. A time slot is a basic time unit and associated with it is a unique time slot index. During any particular time slot there could be a number of waveforms present that are used as the traffic channel. The waveforms may or may not be orthogonal to each other. One or more waveforms are grouped together as a waveform set. Each waveform set has a unique waveform set index. A traffic segment is defined as a combination of prescribed time slot and waveform set indices. In general, a traffic segment contains prescribed waveforms over a prescribed finite time interval.

In a given system, different traffic segments may contain time slots having time intervals of different duration and having waveform sets with different bandwidths. For example, as shown in FIG. 2, traffic segment #1 202 contains one time slot and two waveforms, while segment #2 203 contains two time slots and four waveforms.

All the traffic data between the base station 101 and the wireless terminals 103 is conveyed on traffic segments. A traffic segment is the basic (minimum) unit of the traffic channel resource. In a wireless system, there are downlink traffic segments and uplink traffic segments. The traffic channel resource is allocated in a form of traffic segment allocation. That is, the base station 101 assigns traffic segments to the wireless terminals 103 in the cell such that the assigned wireless terminals 103 receive traffic in the assigned downlink traffic segments or transmit traffic in the assigned uplink traffic segments.

Assignment information is also conveyed in a form of segments, called assignment segments. Assignment segments are separate from traffic segments. In a wireless system, assignment segments are always in the downlink. There are separate assignment segments associated with downlink traffic segments and uplink traffic segments, though they may be coded together in the physical layer.

The form of segment allocation employed in applicants' unique invention is fundamentally different from the prior known form of rate allocation. Specifically, in applicants' invention, the traffic channel resource is managed on a traffic segment basis rather than on a transmission rate basis. Each traffic segment has a prescribed finite time interval, thereby accommodating rapid changes in traffic requirement and wireless channel condition, and enabling efficient traffic channel resource allocation.

Figure 3:
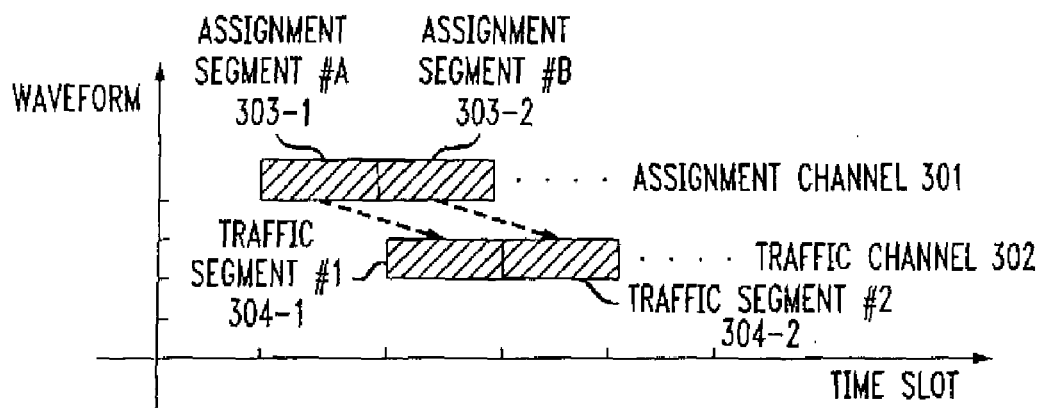
FIG. 3 is a graphical representation illustrating a prescribed relationship between assignment segments and traffic segments also useful in describing the invention.

FIG. 3 illustrates the prescribed association between assignment segments and traffic segments in assignment channel 301 and traffic channel 302, respectively. Thus, as shown, the wireless channel resource (bandwidth and time interval) is partitioned into an assignment channel 301 and a traffic channel 302, among other channels. The assignment channel 301 includes assignment segments 303-1 through 303-N and the traffic channel includes traffic segments 304-1 through 304-M. The sizes, in waveforms and time slots, of different assignment segments 303 may not be the same, and the sizes, in waveforms and time slots, of different traffic segments may not be the same either. However, the partitioning of the assignment channel 301 and traffic channel 302 is fixed, and the construction of assignment segments 303 and traffic segments 304 is also determined a priori. In a preferred embodiment, each assignment segment 303 is associated with a traffic segment 304 in a prescribed one-to-one manner. In a typical situation, the assignment information of a traffic segment 304 is conveyed in the associated assignment segment 303. However, there could be scenarios where an assignment segment 303 conveys the assignment information for more than one traffic segment 304.

Consider a simple example of the association of traffic segment 304 and assignment segments 303. As shown in FIG. 3, each traffic segment 304 is associated with an assignment segment 303 in a prescribed manner. Specifically, downlink traffic segment #1 304-1 is associated with assignment segment #A 303-1 and downlink traffic segment #2 304-2 is associated with assignment segment #B 303-2. Note that uplink traffic segments are associated with assignment segments in a similar fashion. Since the association of a traffic segment 304 and an assignment segment 303 is determined in this prescribed manner, the assignment segment 303 does not necessarily have to contain the resource parameters of the associated traffic segment 304, i.e., the time slot and waveform set indices, thereby significantly reducing the overhead in transmitting assignment segments 303. Moreover, one or more traffic segments 304 may be associated with a single assignment segment 303. The number of traffic segments 304 that are associated with an assignment segment 303 can be either fixed or variable. It should be noted that in the former example, the fixed number of traffic segments 304 is associated with an assignment segment 303, the plurality of traffic segments 304 in effect can be represented as a single larger traffic segment 304. Thus, the association between the plurality of traffic segments 304 with the assignment segment 303 still appears like a one-to-one association. In the latter example, the assignment segment 303 has to explicitly state that number. However, once that number is given, under some a priori arrangement, the assignment segment 303 can specify all the associated traffic segments 304 without explicitly stating their resource parameters. For example, as shown in FIG. 3, traffic segment #1 304-1 is associated with assignment segment #A 303-1. Now suppose assignment segment #A 303-1 states that it includes two (2) traffic segments 304. Am a priori arrangement can be such that the assignment segment #A 303-1 covers traffic segment #1 304-1 and the subsequent traffic segment, which is traffic segment #2 304-2 in this instance. In this instance, assignment segment #A 303-1 covers traffic segment #1 304-1 and traffic segment #2 304-2 and, consequently, there is no need to transmit assignment segment #B 303-2.

In general, a traffic segment 304 does not precede the associated assignment segment 303. The delay from the assignment segment 303 to the traffic segment 304 reflects the time the wireless terminal 103 takes to decode the assignment from the assignment segment 303 and to prepare to transmit or receive the traffic in the associated traffic segment 304. Therefore, in the downlink, the traffic segment 304 can be as early as the associated assignment segment 303, while in the uplink, the assignment segment 303 is generally strictly earlier than the traffic segment 304.

Further, note that the delay from a traffic segment to its associated assignment segment should be chosen to be the minimum possible delay value allowed by the implementation design. For downlink traffic segments, the preferred minimum delay value is zero, i.e., a downlink traffic segment can be as early as the associated assignment segment. For uplink traffic segments, the preferred minimum delay value is the time interval required by a wireless terminal to receive and to decode the assignment segment and to prepare and to encode the traffic data to be transmitted in the assigned uplink traffic segment, which is limited by the mobile processing capability.

An important aspect of the invention is that there is no need to expressly include the wireless terminal identifier in the traffic segments.

Figure 4:
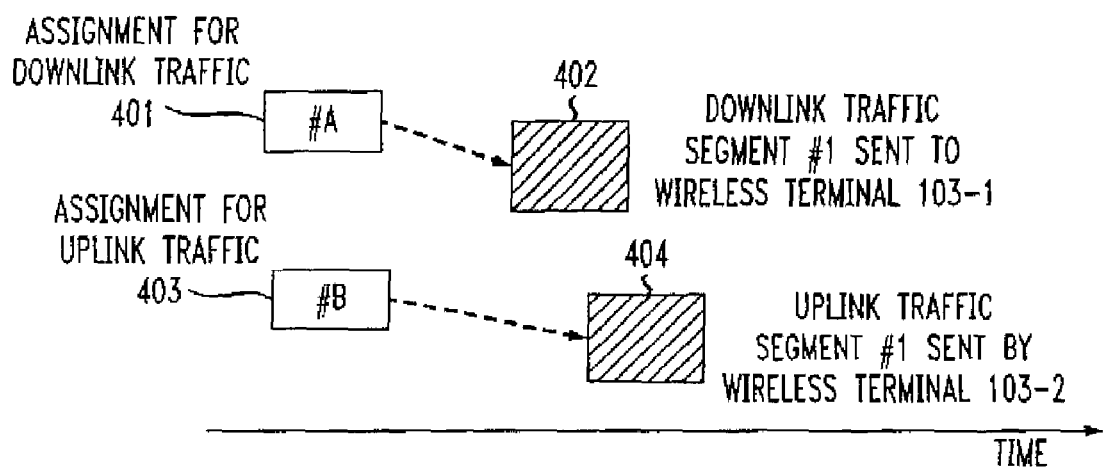
FIG. 4 is a graphical representation illustrating the allocation of traffic segments to wireless terminals also useful in describing the invention.

FIG. 4 is a graphical representation illustrating the allocation of traffic segments to wireless terminals also useful in describing the invention. The essential information to be contained in an assignment segment is the identifier of the wireless terminal 103 to be utilizing the associated traffic segment. In the downlink, the user identifier indicates which user is to receive traffic from the associated traffic segment. In the uplink the user identifier indicates which user is allowed to transmit traffic with the associated traffic segment. Additionally, by including in the assignment segment some physical layer parameters such as coding rate and bits-per-symbol to be used in the associated traffic segment, the system allows those physical layer parameters to be rapidly changed on a segment by segment basis. Such change may be necessary to accommodate variations of wireless channel conditions, traffic requirements and other scheduling considerations. It will be apparent to those skilled in the art that the actual coding rate or bits-per-symbol indication does not have to be expressly transmitted, and that some predetermined convention may be employed using representations of the physical parameters to be communicated.

FIG. 4 shows that the logical flow of assigning traffic segments. The base station 101 transmits the assignment segments in the downlink. All the active wireless terminals 103 monitor all the assignment segments to see whether their user identifiers appear in the assignment segments. As shown in FIG. 4, wireless terminal 103-1 sees its identifier 401 in the assignment segment for downlink traffic segment #1 402, and thus receives traffic in the assigned downlink traffic segment #I 402. Meanwhile, wireless terminal 103-2 sees its identifier 403 in the assignment segment for uplink traffic segment #1 403, and thus transmits traffic in the assigned uplink traffic segment #1 404.

Figure 5:
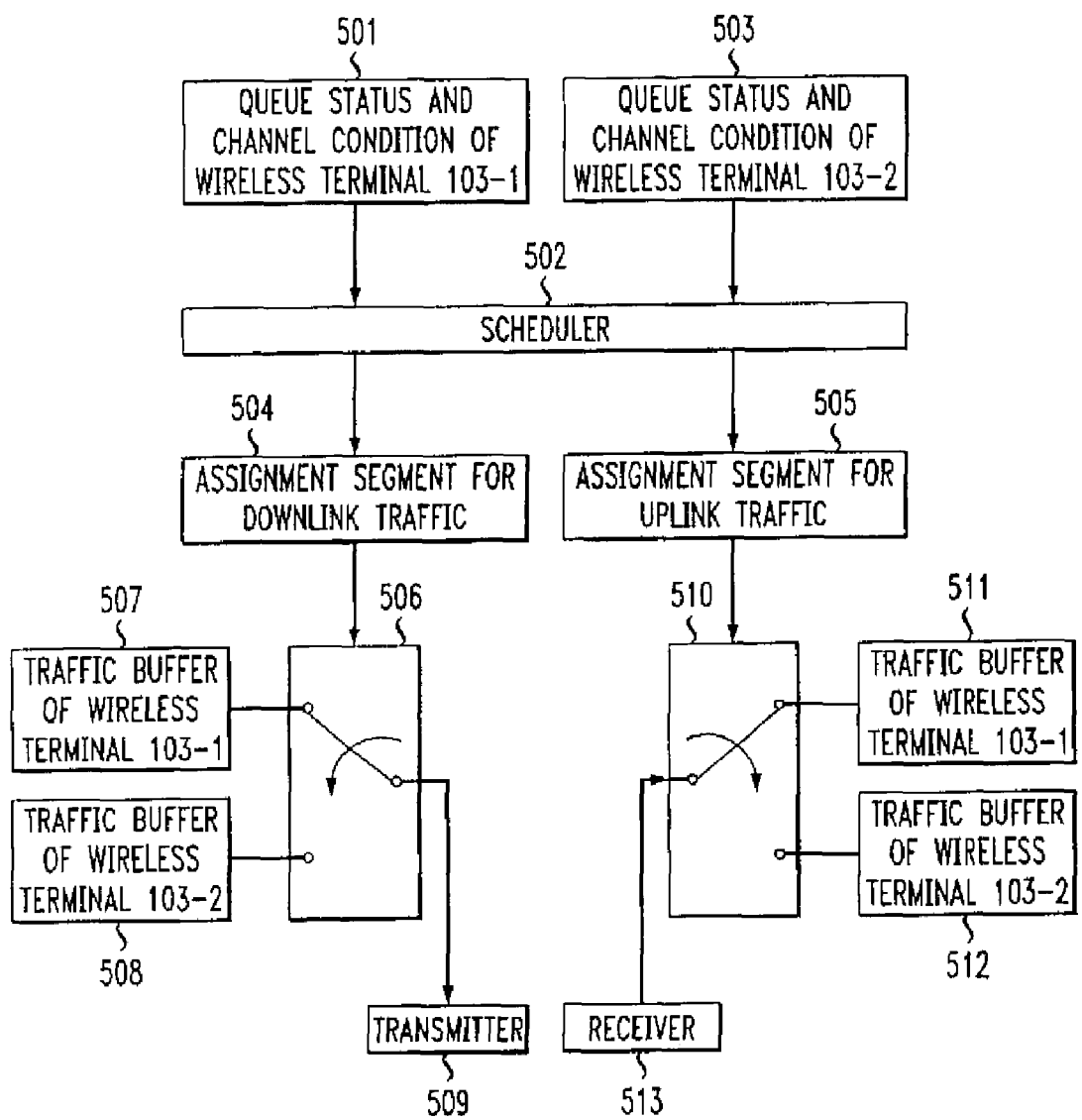
FIG. 5 shows, in simplified block diagram form, details of an embodiment of the invention in which segment assignment and scheduling are employed.

FIG. 5 shows, in simplified block diagram form, details of an embodiment of the invention in which segment assignment and scheduling are employed. The segment allocation shown in FIG. 4 allows efficient traffic channel resource allocation, improves spectral utilization, and facilitates flexible traffic scheduling. FIG. 5 shows a simplified implementation of combining traffic segment assignment and scheduling.

The base station 101 maintains a table of traffic queue status, and wireless channel condition if possible, for individual wireless terminals 103. In this example, base station 101 maintains queue status and channel condition 501 for wireless terminal 103-1 and queue status and channel condition 503 for wireless terminal 103-2. The base station scheduler 502 periodically checks the queue tables 501 and 503 and determines the traffic segment assignment based on some prescribed scheduling policy. The assignment is then broadcast in associated assignment segments via 504 for downlink traffic and via 505 for uplink traffic. Downlink traffic for the assigned wireless terminal 103, i.e., wireless terminal 103-1 or wireless terminal 103-2, is then transmitted via transmitter 509 with the associated traffic segment by the base station 101, while uplink traffic is received via receiver 513 at the base station 101 with the associated traffic segment from the assigned wireless terminal 103, i.e., wireless terminal 103-1 or wireless terminal 103-2. The downlink transmission is effected by controllable switching unit 506 being controlled to select the data for transmission from either a traffic buffer 507 for wireless terminal 103-1 or traffic buffer 508 for wireless terminal 103-2. Similarly, received data is controllable supplied from receiver 513 via controllable switch 510 either to traffic buffer 511 for wireless terminal 103-1 or traffic buffer 512 for wireless terminal 103-2.

Spectral utilization of the traffic channel resource is improved by combining segment assignment and scheduling. For example, in an idle interval during which no traffic needs to be transmitted for one wireless terminal 103, the base station scheduler 502 simply puts the identifier of another wireless terminal 103 in the assignment segment so that that wireless terminal 103 can utilize the channel resource in the idle interval. Another example is that when high priority traffic arrives, the base station 101 simply puts the identifier of the high priority wireless terminal 103 in the assignment segment, thereby changing the resource allocation without introducing significant latency. Similarly, when the base station 101 determines that wireless terminal 103-1's channel condition becomes better than wireless terminal 103-2's, the base station 101 can simply switch the segment allocation from wireless terminal 103-2 to wireless terminal 103-1 by putting wireless terminal 103-1's identifier instead of wireless terminal 103-2's identifier in the assignment segments.

Figure 6A:
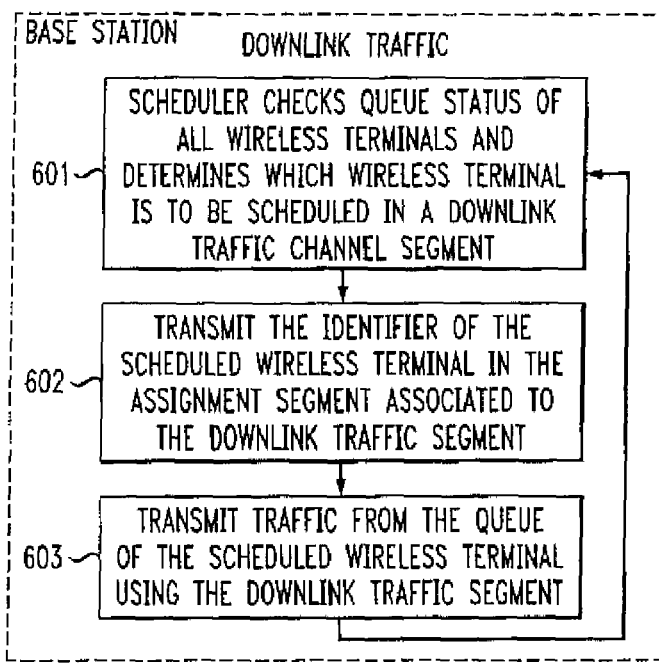
FIG. 6A is a flowchart illustrating steps in a base station process for allocating the downlink traffic resource in accordance with the invention.

FIG. 6A is a flowchart illustrating steps in a base station process for allocating the downlink traffic resource in accordance with the invention. Thus, in step 601 base station scheduler 502 checks the queue status of all wireless terminals 103 and determines which wireless terminal 103 is to be scheduled in a downlink traffic segment. Then, step 602 causes the transmission of the scheduled wireless terminal 103 identifier in an assignment segment associated with the downlink traffic segment. Thereafter, in step 603, traffic from the transmit queue, i.e., transmit traffic buffer, of the scheduled wireless terminal 103 is transmitted via transmitter 509 using the associated downlink traffic segment. Then, steps 601, 602 and 603 are iterated.

Figure 6B:
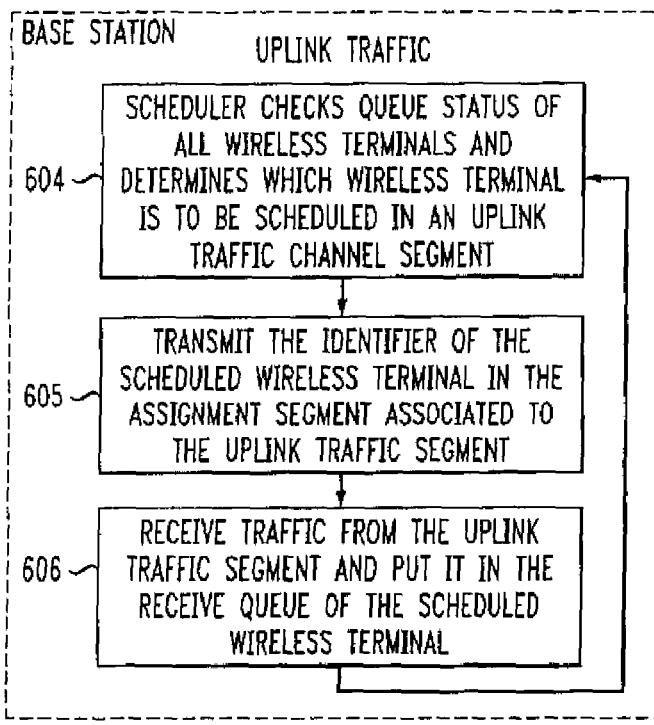
FIG. 6B is a flowchart illustrating steps in a base station process for allocating the uplink traffic resource in accordance with the invention.

FIG. 6B is a flowchart illustrating steps in a base station process for allocating the uplink traffic resource in accordance with the invention. Thus, in step 604 base station scheduler 502 checks the queue status of all wireless terminals 103 and determines which wireless terminal 103 is to be scheduled in an uplink traffic segment. Then, step 605 causes the transmission of the scheduled wireless terminal 103 identifier in an assignment segment associated with the uplink traffic segment. Thereafter, in step 606, traffic received from receiver 513 in the associated uplink traffic segment is put in the receive queue, i.e., receive traffic buffer, of the scheduled wireless terminal 103. Then, steps 604, 605 and 606 are iterated.

Figure 7A:
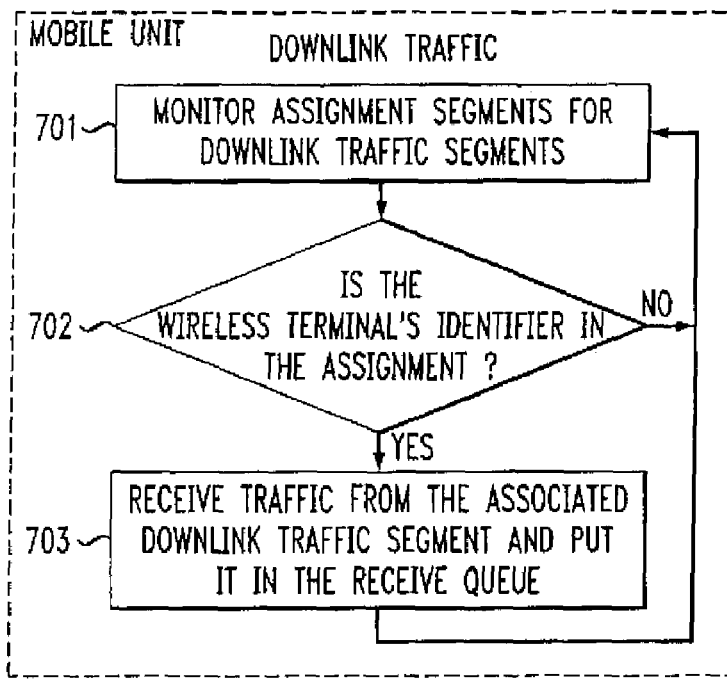
FIG. 7A is a flowchart illustrating steps in a wireless terminal process for detecting allocation of the downlink traffic resource to it in accordance with the invention.

FIG. 7A is a flowchart illustrating steps in a wireless terminal process for detecting allocation of the downlink traffic resource to it in accordance with the invention. In step 701 all the active wireless terminals 103 monitor all of the assignment segments for an assignment of downlink traffic segments. Then, step 702 tests to determine if the wireless terminal's identifier is in the assignment associated with the detected downlink traffic segments. If the test result in step 702 is NO, control is returned to step 701 and steps 701 and 702 are repeated until step 702 yields a YES result. This YES result in step 702 indicates that the wireless terminal's identifier has been detected in the assignment. Then, step 703 causes traffic received in the associated downlink traffic segment to be placed in the receive queue for the assigned wireless terminal 103. Thereafter, steps 701, 702 and 703 are repeated.

Figure 7B:
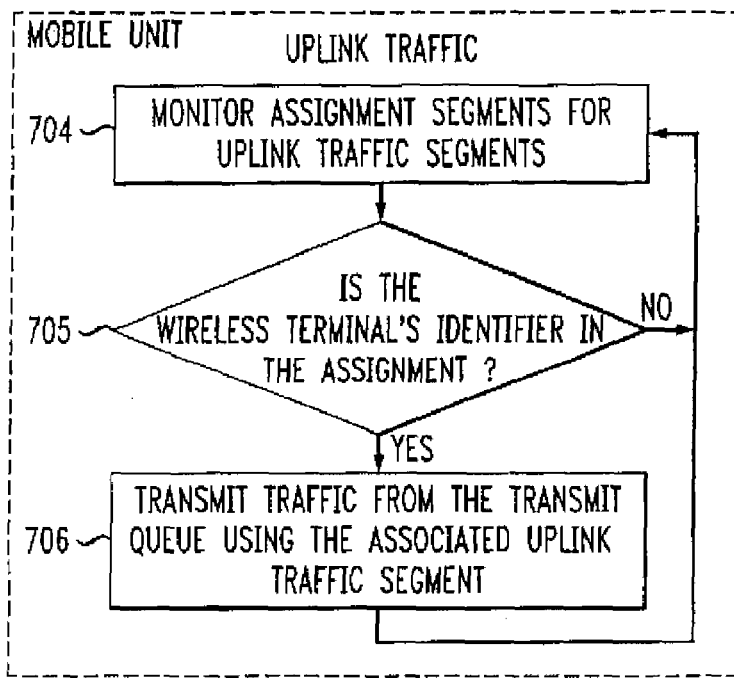
FIG. 7B is a flowchart illustrating steps in a wireless terminal process for detecting allocation of the uplink traffic resource to it in accordance with the invention.

FIG. 7B is a flowchart illustrating steps in a wireless terminal process for detecting allocation of the uplink traffic resource to it in accordance with the invention. In step 704 all the active wireless terminals 103 monitor all of the assignment segments for an assignment of uplink traffic segments. Then, step 705 tests to determine if the wireless terminal's identifier is in the assignment associated with the detected uplink traffic segments. If the test result in step 705 is NO, control is returned to step 704 and steps 704 and 705 are repeated until step 705 yields a YES result. This YES result in step 705 indicates that the wireless terminal's identifier has been detected in the assignment. Then, step 706 causes traffic to be selected from the assigned wireless terminal's transmit queue to be transmitted in the associated uplink traffic segment. Thereafter, steps 704, 705 and 706 are repeated.

The above-described embodiments are, of course, merely illustrative of the principles of the invention. Indeed, numerous other methods or apparatus may be devised by those skilled in the art without departing from the spirit and scope of the invention. Moreover, the invention may be implemented as hardware, as an integrated circuit, via programming on a microprocessor, on a digital signal processor or the like.

What is claimed is:

1. A method of allocating an uplink wireless channel resource for use in a wireless multiple access communications system comprising at least one base station and a plurality of wireless terminals and including a downlink wireless channel resource in addition to said uplink wireless channel resource, the method comprising the steps of:

partitioning said downlink wireless channel resource into at least an uplink assignment channel resource including a plurality of uplink assignment segments;

partitioning said uplink wireless channel resource into an uplink traffic channel resource including a plurality of uplink traffic segments, wherein said partitioning of said downlink wireless channel resource into said plurality of uplink assignment segments and of said uplink wireless channel resource into said plurality of uplink traffic segments is in a fixed one-to-one manner with each uplink assignment segment corresponding to one of said plurality of uplink traffic segments, each particular uplink assignment segment starting prior to the traffic segment to which the particular uplink assignment segment corresponds;

scheduling the assignment of said uplink traffic segments in accordance with a scheduling policy, said step of scheduling including determining which of said wireless terminals are active, if any, and are to transmit traffic data in an uplink traffic segment;

transmitting an identifier that identifies a scheduled wireless terminal in an uplink assignment segment associated on said fixed one-to-one basis with a corresponding uplink traffic segment, the wireless terminal identified by the transmitted identifier being scheduled to use the uplink traffic segment corresponding to the assignment segment in which the identifier is transmitted; and receiving traffic data from said scheduled wireless terminal in said uplink traffic segment corresponding to the uplink assignment segment in which the identifier of the scheduled wireless terminal is transmitted.

2. The method as defined in claim 1 wherein said step of scheduling includes the steps of checking status of a plurality of active wireless terminals, and in response to said status check, determining which one of said active wireless terminals is to transmit traffic data in an uplink traffic segment.

3. The method as defined in claim 2 wherein the status being checked includes at least one of: traffic priority, traffic queue status and physical channel condition.

4. The method as defined in claim 1, wherein partitioning said downlink channel resource includes partitioning said downlink channel resource into a plurality of downlink traffic segments and downlink assignment segments in addition to said plurality of uplink assignment segments, the method further including:

allocating a downlink traffic segment to a wireless terminal scheduled to receive data from said base station.

5. The method as defined in claim 4 wherein said step of allocating a downlink traffic segment includes the steps of:

transmitting a wireless terminal identifier corresponding to the wireless terminal scheduled to receive data from said base station in a downlink assignment segment corresponding to the scheduled downlink traffic segment to be used to communicate data to said wireless terminal scheduled to receive data.

6. A base station for use in a wireless multiple access communications system including a plurality of wireless terminals and a wireless channel resource including a downlink wireless channel resource and an uplink wireless channel resource, said downlink wireless channel resource being used to allocate one or more portions of the uplink wireless channel resource to one or more of said wireless terminals, the base station comprising:

means for partitioning said downlink wireless channel resource into at least an uplink assignment channel resource including a plurality of uplink assignment segments and for partitioning said uplink wireless channel resource into at least a plurality of uplink traffic channel segments, said partitioning into a plurality of uplink assignment segments and uplink traffic channel segments being performed in a fixed manner such that each assignment segment corresponding to one of said plurality of uplink traffic segments in a fixed one-to-one manner;

a scheduler to schedule the assignment of said uplink traffic segments to said wireless terminals in accordance with a scheduling policy, said scheduler including means for determining which of said wireless terminals are active, if any, and have data to transmit in an uplink traffic segment;

a transmitter for transmitting an identifier identifying a wireless terminal scheduled to transmit data, said identifier being transmitted in an assignment segment associated on said fixed one-to-one basis with an uplink traffic segment scheduled to be used by the identified wireless terminal for the transmission of data; and a receiver for receiving traffic data from the scheduled wireless terminal in said uplink traffic segment corresponding in said fixed one-to-one manner to the uplink traffic assignment segment in which the identifier used to identify the scheduled wireless terminal was transmitted.

7. The base station as defined in claim 6, wherein said scheduler includes:

means for checking the status of active wireless terminals, and in response to said status check, determining which one of said active wireless terminals is to transmit traffic data in an uplink traffic segment.

8. The base station as defined in claim 7 wherein the status being checked includes at least one of: traffic priority, traffic queue status and physical channel condition.

9. The base station as defined in claim 6, wherein said means for partitioning said downlink channel resource includes means for partitioning said downlink channel resource into a plurality of downlink traffic segments and downlink assignment segments in addition to said plurality of uplink assignment segments, the base station further including:

means for allocating a downlink traffic segment to a wireless terminal scheduled to receive data from said base station.

10. The base station as defined in claim 9 wherein said means for allocating a downlink traffic segment includes means for transmitting a wireless terminal identifier corresponding to the wireless terminal scheduled to receive data from said base station in a downlink assignment segment corresponding to the scheduled downlink traffic segment to be used to communicate data to said wireless terminal scheduled to receive data.

11. The method as defined in claim 1, wherein said uplink assignment segments further include prescribed physical layer parameters to be used by said wireless terminal when transmitting in the corresponding assigned uplink traffic segment.

12. The method as defined in claim 11, wherein said physical layer parameters include representations of the traffic data coding rate and bits-per-symbol to be employed when transmitting in said corresponding uplink traffic segment.

13. The method as defined in claim 11 wherein said physical layer parameters include representations of the maximum allowed traffic data coding rate and bits-per-symbol scheme to be employed when transmitting in said corresponding uplink traffic segment.

14. The base station as defined in claim 6, wherein said uplink assignment segments further include prescribed physical layer parameters to be used by said wireless terminal when transmitting in the corresponding assigned uplink traffic segment.

15. The base station as defined in claim 14, wherein said physical layer parameters include representations of the traffic data coding rate and bits-per-symbol to be employed when transmitting in said corresponding uplink traffic segment.

16. The base station as defined in claim 14 wherein said physical layer parameters include representations of the maximum allowed traffic data coding rate and bits-per-symbol scheme to be employed when transmitting in said corresponding uplink traffic segment.

17. The method as defined in claim 1, wherein said wireless multiple access communications system comprises a spread spectrum multiple access communications system.

18. The method as defined in claim 1, wherein said wireless multiple access communications system comprises an orthogonal frequency division multiplexing based multiple access communications system.

19. The base station as defined in claim 6, wherein said wireless multiple access communications system comprises a spread spectrum multiple access communications system.

20. The base station as defined in claim 6, wherein said wireless multiple access communications system comprises an orthogonal frequency division multiplexing based multiple access communications system.

* * * * *